Patented June 11, 1940

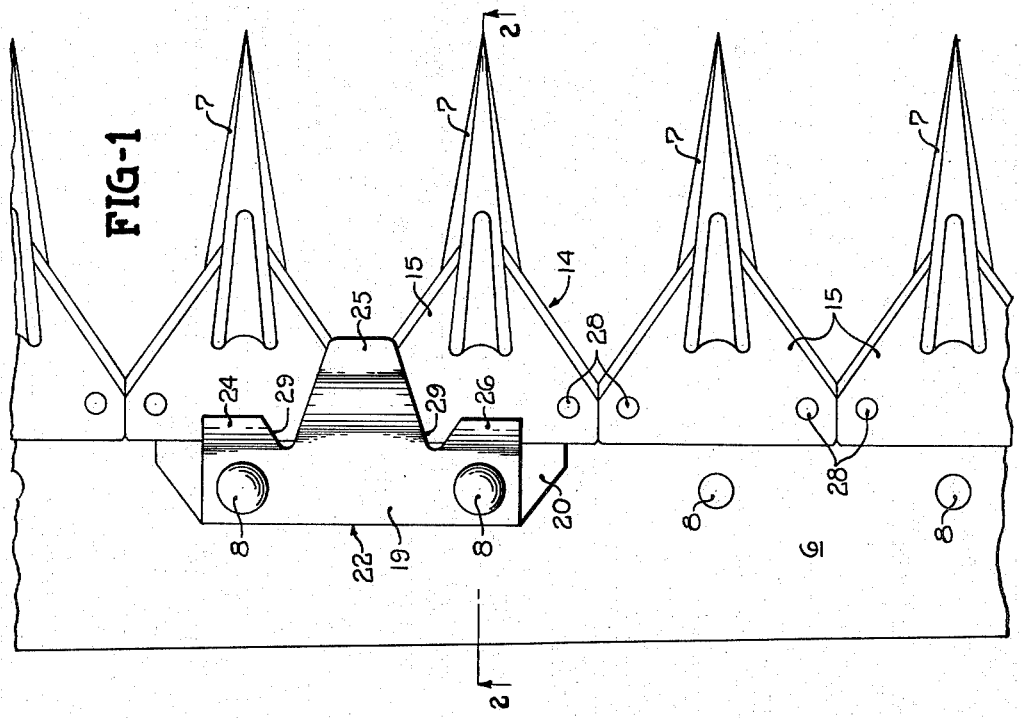
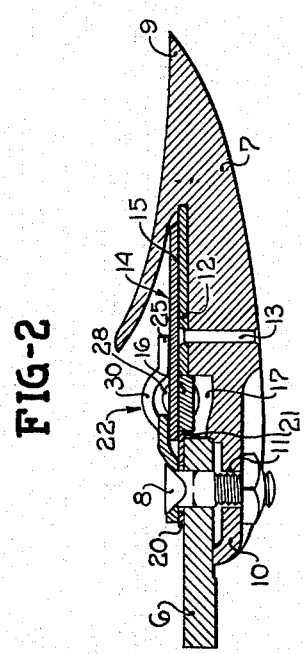
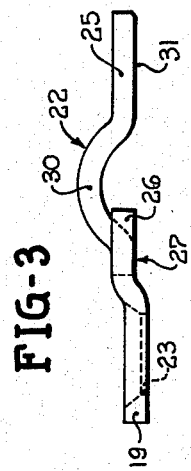
INVENTORS
WILBUR J. COULTAS
CARL J. FREDERIKSEN
ATTORNEYS.

2,203,982

UNITED STATES PATENT OFFICE 2,203,982

CUTTING APPARATUS

Wilbur J. Coultas and Carl J. Frederiksen, Moline, Ill., assignors to Deere & Company, Moline, Ill., a corporation of Illinois Application March 31, 1939, Serial No. 265,099

2 Claims. (Cl. 56—305)

The present invention relates generally to cutting apparatus for mowers and the like, and is more particularly concerned with means for holding the cutting edges of the sickle and cutter bar together in good shear contact.

The principal object of the present invention is to provide a simple and inexpensive device adapted to be mounted on mower cutter bars for holding the reciprocating knife against the guard plates in proper shear contact therewith at all points along the blade edges. The efficiency and ease of operation of the cutter bar are greatly improved by maintaining the proper shear contact between the blades at all times, and the knife readily cleans itself of all material that otherwise tends to clog the cutter bar when either the toe or heel of the knife is allowed to lift away from the guard plates.

Other objects and advantages of the present invention will become apparent to those skilled in the art after a consideration of the following detailed description of the preferred embodiment thereof, reference being had to the accompanying drawing, in which Figure 1 is a fragmentary plan view of a mower cutter bar, showing a knife-holding clip embodying the principles of our invention;

Figure 2 is a sectional view, taken along the line 2—2 in Figure 1; and

Figure 3 is an enlarged end view of the knife-holding clip.

Referring now to the drawing, the reference numeral 6 indicates a cutter bar having a plurality of forwardly extending guards 7 fixedly secured thereto at regularly spaced intervals by means of rivets or bolts 8. The guards 7 are usually in the form of castings, terminating at one end in a forwardly directed pointed portion 9 and at the other end in an attaching section 10 having holes 11 provided therein to receive the bolts 8. A ledger plate 12 having cutting edges adapted to cooperate with the knives of a reciprocating sickle 14, is fixedly secured to each of the guards 7 by rivets 13. The sickle 14 comprises knife sections 15 which are fixed by rivets 28 to a knife back 16 that rests in a recess 17 formed in the guards 7, and these knife sections extend rearwardly of the knife bar to rest on wear plates 20, a plurality of which are employed in most present day harvester cutting mechanisms. The wear plates 20 are bent downwardly over the front edge of the cutter bar 6, as at 21, to provide guide and wear surfaces for the knife back 5.

With each wear plate is a knife holder or clip, indicated in its entirety by the reference numeral 22, that is secured in place by the bolts 8 which also secure the wear plates 20 and the guards 7 to the cutter bar 6. The holders extend forwardly over the sickle bar 14 and operate to hold the knife sections 15 in proper cutting engagement with the ledger plate 12. Each knife holder 22 consists of a body portion 19, preferably formed of steel plate and having two chamfered holes 23 in the ends thereof to receive the countersunk bolts 8. One edge of the plate is raised slightly to bring the under side thereof level with the top surface of the knife sections 15 and is provided with lips 24 and 26 that extend out over and engage the adjacent rear edge of the knife sections to hold the latter down against the wear plate 20. Disposed between the lips is a tongue 25 that also extends out over the sickle 14 and likewise engages the rear edge of the knife sections 15 with the bearing surface 27. The tongue 25 is arched forwardly, as at 30, across the knife back 16 to clear the heads of the rivets 28 and has a second bearing surface at 31 that is adapted to bear upon the sickle knives above that portion which is supported on the ledger plates. Thus, the rearward portion of the knife section is held firmly down against the wear plate 20 by the lips 24, 26 and by the bearing surface 27 of the tongue, while the forward portion thereof is held down against the ledger plates 12 by the bearing surface 31 of the tongue. The knife sections are prevented from lifting away from the ledger plates, and as a result the cutting mechanism tends to clean itself instead of clogging, as frequently happens when the knife sections are held at only one point.

Each of the lips 24, 26 extends from the body portion 19 independent of the tongue 25 and separated therefrom by recesses 29 and can therefore be independently adjusted to proper bearing contact with the sickle. Adjustment is accomplished by striking each of the lips 24, 26 and tongue 25 with a hammer to bend them down into suitable engagement with the backs of the knife blades 15. Conventional knives are provided with only a tongue similar to the tongue portion 25 and it is difficult to adjust the rear bearing surface 27 to proper holding contact with the rear edge of the knife and at the same time maintain proper contact between the forward bearing surface 31 and the knives. By providing the laterally spaced lips or fingers 24, 26, it is not as essential to maintain the contact with the rear bearing surface of the tongue.

The independently extending lips and tongue may be separately heat treated at the tips thereof by quenching or otherwise, as will be understood by those skilled in the art, to provide hard, long wearing tips while maintaining a malleable structure at the bases thereof.

What we claim as our invention is:

1. A knife clip for a mower comprising a unitary plate member having a supporting portion along the rear edge thereof, a tongue portion formed integrally therewith and extending forwardly and having a bearing surface at the forward end thereof adapted to slidably engage a sickle, and a lip portion formed integrally therewith extending forwardly from said supporting portion adjacent said tongue portion but spaced laterally therefrom to provide a notched recess therebetween, said lip portion having a bearing surface adapted to slidably engage said sickle at a position spaced rearwardly of said tongue bearing surface.

2. A knife clip for a mower comprising a unitary plate member having a supporting portion along the rear edge thereof adapted to be fixed to a cutter bar, an integrally formed tongue portion arching forwardly from said supporting portion and having a bearing surface along the forward end thereof adapted to slidably engage a sickle near the front portion of the latter, and a pair of integrally formed, forwardly extending lip portions disposed on opposite sides of said tongue portion, respectively, but spaced laterally therefrom to provide notched recesses between said tongue and each of said lip portions whereby said tongue and lip portions may be separately heat treated to provide hard tips at their forward ends while maintaining a malleable structure at the bases thereof.

WILBUR J. COULTAS.
CARL J. FREDERIKSEN.